July 19, 1966 H. A. WEYER 3,261,197
VIBRATION ABSORBING STRESS MEANS FOR HORIZONTAL RAM IMPACTERS
Filed Nov. 13, 1963 3 Sheets-Sheet 3
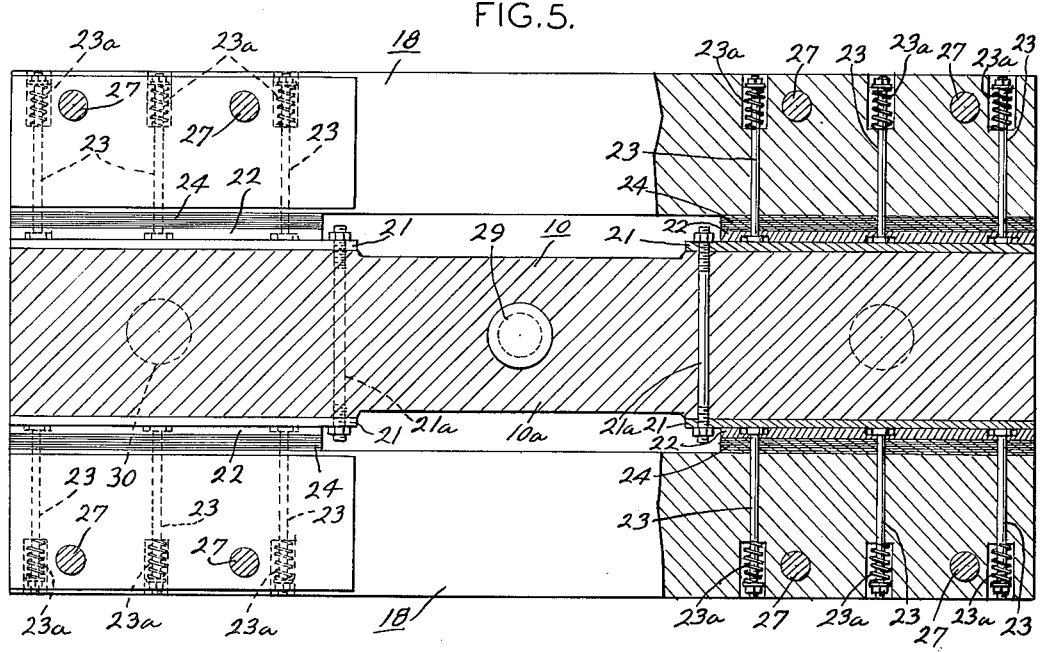
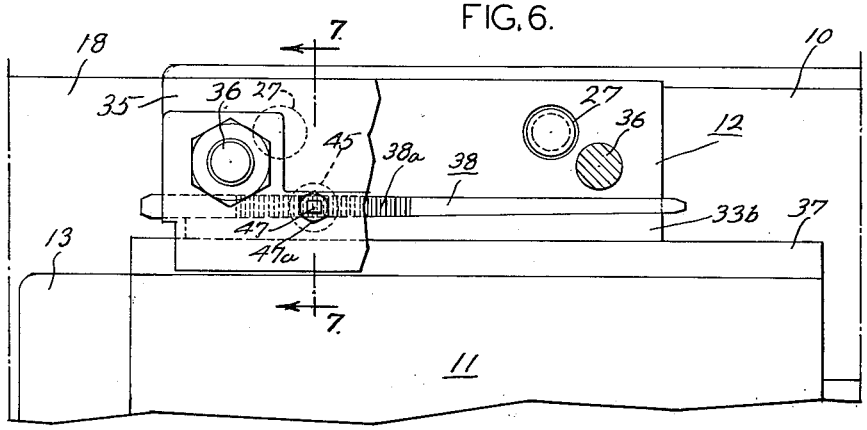
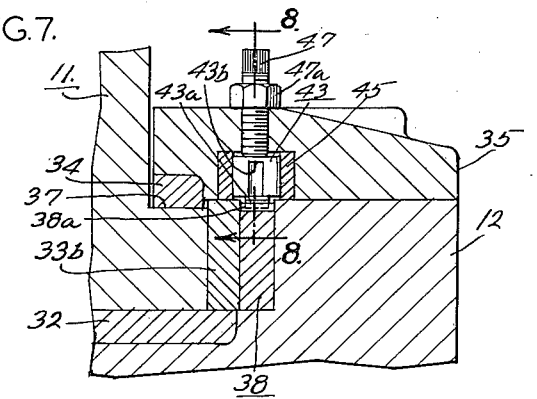
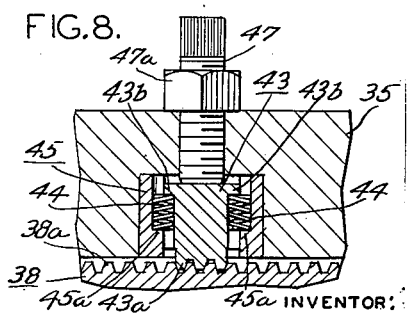
INVENTOR:
HENRY A. WEYER
BY Howson & Howson
ATTYS.

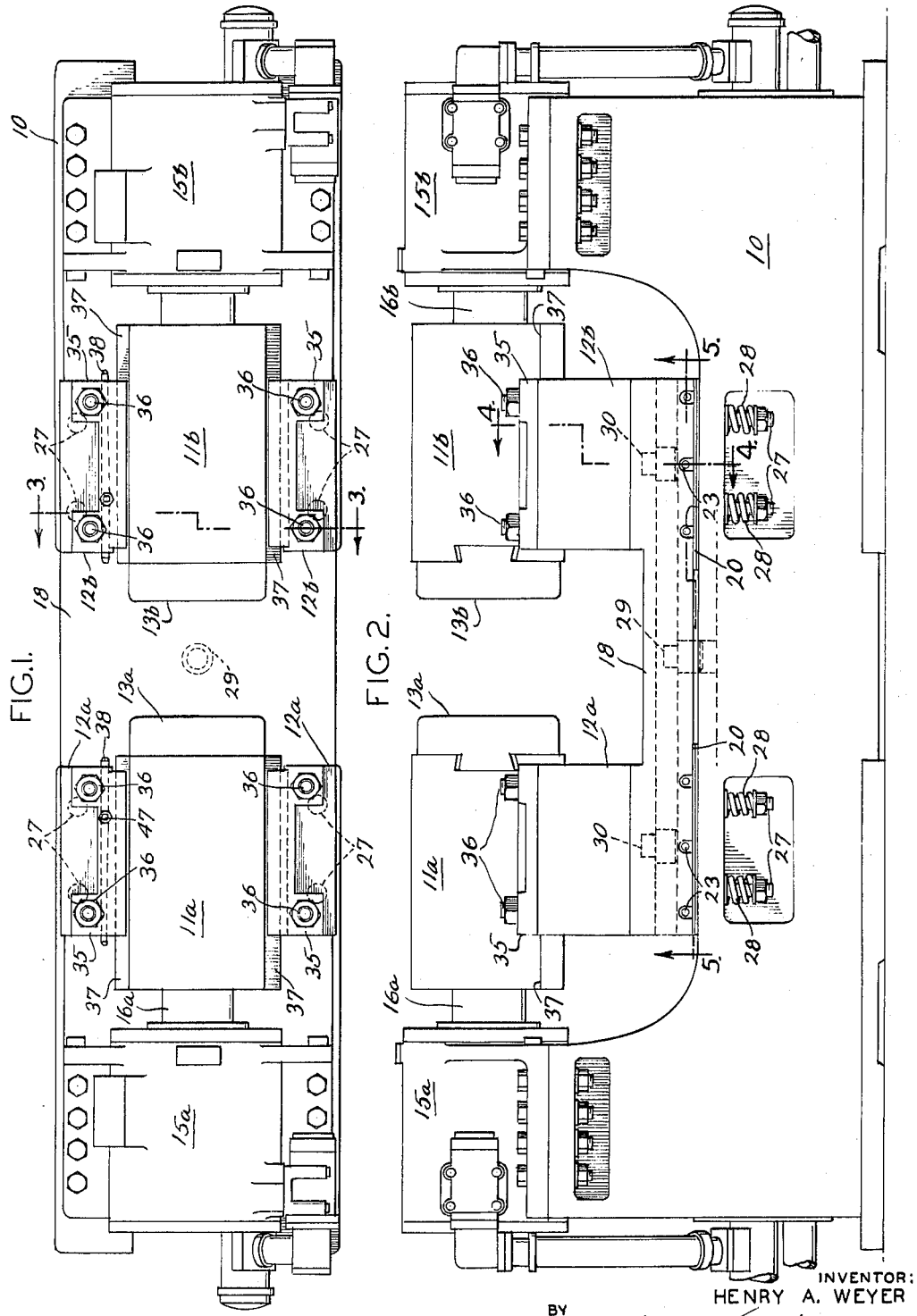

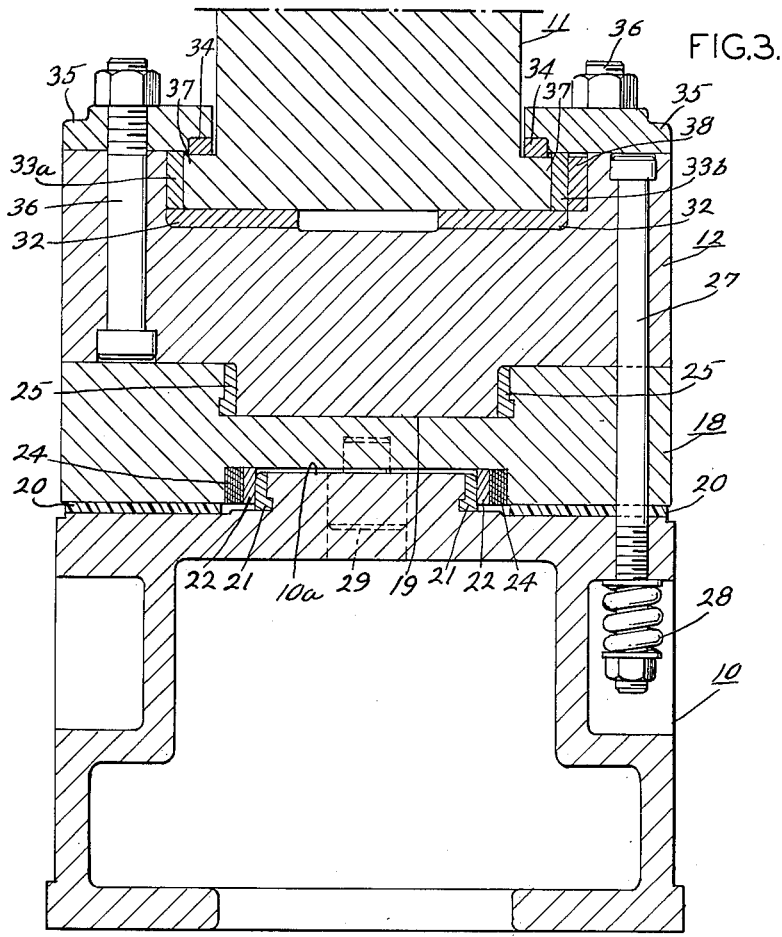
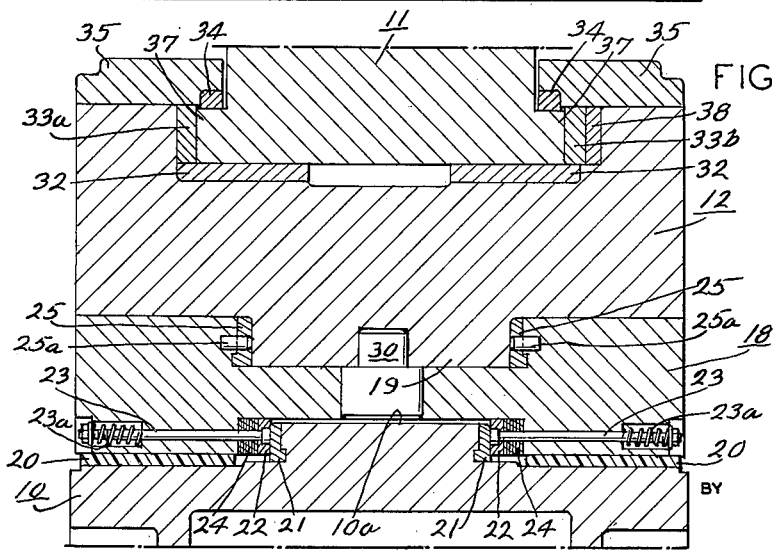

3,261,197
VIBRATION ABSORBING STRESS MEANS FOR
HORIZONTAL RAM IMPACTERS
Henry A. Weyer, Chambersburg, Pa., assignor to Chambersburg Engineering Company, Chambersburg, Pa., a corporation of Pennsylvania
Filed Nov. 13, 1963, Ser. No. 323,438
15 Claims. (Cl. 72—407)

The present invention relates to horizontal ram impacters and more particularly to means for use with such machines to absorb shock and vibration from the rams when a forging is struck outside the ram's centerline and prevent such shock and vibration from being transmitted to the base.

Horizontal ram impacters in general have the great advantage of being essentially vibration-free, especially when compared with vertical drop hammers or other forging impacters of the prior art. When an element is forged by permitting the rams of a horizontal impacter to meet at the midpoint between them, the very nature of the opposed dynamic forces involved is such that upon impact they tend to cancel and are nullified. In fact, in a balanced operation the base of the machines is disturbed so little that a coin may be stood on edge on the base of the machine without being knocked over by vibration during the course of repeated impacts. However, this balanced condition presupposes proper centering of dies and impact on work at a predetermined axis or centerline of the rams as well as at this midpoint between the rams. Vibrations occur whenever a forging is struck outside the centerline of the impacter rams or substantially off-center. An example of a situation where such conditions exist is a multiple forging process where blows are struck off the centerline. In such a situation, or others where off-center impact occurs, the resulting forces have heretofore been transmitted to the base and consequently affect all parts attached to or housed within the base. Since control equipment of various types is normally housed in the base, the resulting vibration has resulted in premature failure of certain components in machines where large amounts of off-center forging work have been done.

Since horizontal ram impacters have been designed in the past with the idea that little or no vibration forces would occur, their usefulness for off-center forging is severely limited. While building machines with heavier frame construction and shock-resistant components or with shock-damageable components in a separate housing might overcome at least part of the problems, such changes would effectively be a step backward from the efficiency and compactness achieved in present day horizontal ram impacters and would materially increase their cost.

In accordance with the present invention, I have isolated substantially all vibrations from the base of the impacter without increasing its size or the size or weight of its components. I have done this by insulating the base from vibrations by certain structural modifications which do not require increasing the size of the machine. Thus, the present invention makes possible a rugged machine whose cost is not greatly increased over that of a machine designed for centerline forging. The present invention also makes possible the housing within the base of the same components previously housed in vibration-free machines in which only on-center impacts were intended.

In accordance with the present invention, an additional floating plate member is employed between the base and the ram guide. The floating plate member is provided with a tongue and groove fit at least within the base and opposed vertical surface of the tongue or groove are provided with wearing plates backed by resilient shock absorbing means which isolates the base from vibration and shock due to laterally off-center blows. Fabric-like absorption means between at least one pair of the stacked base, floating plate member and guide serves to absorb shock and vibration from blows struck below the centerline. Heavy-duty springs on each of the bolts holding together the base, floating plate member and guide serve to absorb shock and vibration from blows struck above the centerline.

For a better understanding of the present invention, reference is made to the drawings in which:

FIG. 1 is a plan view from above of a horizontal ram impacter of the present invention;
FIG. 2 is a side elevational view of the horizontal ram impacter of FIG. 1;
FIG. 3 is a sectional view taken on line 3—3 of FIG. 1;
FIG. 4 is a sectional view taken on line 4—4 of FIG. 2;
FIG. 5 is a sectional view of part of the structure taken along line 5—5 of FIG. 2;
FIG. 6 is a detailed plan view from above and partially broken away to show in plan certain portions of the structure;
FIG. 7 is a detailed sectional view taken on line 7—7 of FIG. 6; and
FIG. 8 is a detailed sectional view taken on line 8—8 of FIG. 7.

The horizontal ram impacter of the present invention is broadly that standard article of manufacture well known to those in the trade and broadly described in United States Patent 2,615,306 to R. L. Alcorn, Jr. and United States Patent 2,742,802 to E. C. Clarke and H. A. Weyer. Broadly, this impacter consists of a base generally designated 10, which may be a metal casting with suitable weight supporting and distributing feet so that it can be placed upon and possibly bolted to the floor of the shop in which it is installed. A pair of opposed rams 11a and 11b are physically supported from the base by suitable guides generally designated 12a and 12b which function to bear the weight, guide the direction, and absorb any shock of their respective rams. Suitable opposed dies 13a and 13b supported on the rams actually accomplish the forging between them. The rams are driven toward and away from one another by means of pistons within cylinders 15a and 15b. These pistons are preferably connected to the rams described in United States Patent 3,080,778 to R. L. Alcorn, Jr. by suitable columns 16a and 16b which may be of a light-weight special construction since any shock generated at the rams is not transmitted through them. Control and synchronization of these rams may be accomplished by a control system such as that described in United States Patent 3,048,019 to E. C. Clarke and H. A. Weyer which insure that the rams meet as desired, usually at their midpoint. The synchronizing means may assure the rams meeting precisely in their midpoint or in some cases, as required, at a precise predetermined point other than the midpoint.

While meeting at some point other than the midpoint between the rams is responsible for generating certain vibrations, more severe and more frequently encountered vibration effects which may be transferred to the base are produced by having the dies strike the work piece off-center or off the ram axis. Because of the column construction and connection to the rams of the Alcorn Patent 3,080,778, shock and vibration reaches the base only through the ram guides. In order to isolate the base from such vibrations, in accordance with the present invention an intermediate member or floating plate member 18 is provided between the ram guides 12a and 12b and the base. Although this floating plate extends the length of both guides 12a and 12b and the distance between them as seen in FIGS. 1 and 2, since both rams and guides and their associated structures are identical, only one side of the machine need be described. Hereinafter the structure will therefore be described in terms of the ram member 11b and its guide 12b without reference to their suffixes (i.e., 11 and 12) and it will be understood by those skilled in the art that these structures are identical respectively to corresponding structure associated with ram 11a and guide 12a in all important respects.

Referring particularly to FIGS. 3 and 4, it will be seen that floating plate member 18 is provided with a pair of grooves on opposite sides for receiving tongues 10a and 19 on the base 10 and guide 19, respectively. Between two of the adjacent members and preferably between the base 10 and the floating plate 18 is placed a heavy laminated fabric or fabric-like material 20 which has great strength and which has the property of absorbing and damping out shock and vibration, such as the fabric known as "Fabreeka." This material is used solely between the float contacting horizontal surfaces of the two members. Between each of the opposed walls of the tongue and groove defined by the discontinuities between the broad float surfaces are inserted steel wearing plates, plates 21 fixed to tongue 10a and plates 22 fixed to sidewalls of the groove in the plate 18 (see also FIG. 5). The wearing plates 21 are attached to base 10 by bolts 21a. The wearing plates 22 are attached to floating plate 18 by bolts 23 which permit movement toward plates 22 and away from plates 21 but no longitudinal movement. Between wearing plates 22 and the groove sidewalls in the floating plate 18 are elastic steel shim packs 24 which provide heavy spring-like resilience urging plates 22 toward plates 21. These shim packs 24 consist of many different thicknesses of spring steel shims and by lamination of flat spring steel is able to provide the desired resilience in a small volume of space. The bolts 23 holding the wearing plates are also spring-loaded by springs 23a in opposition to the inward urging of the shim packs against the wear plate 22 so that springs 23a tend to prestress the shim packs. This arrangement eliminates clearances between the tongue and groove but permits limited lateral movement which allows the shim pack to breathe or deflect during operation. The shim packs 24 function to locate and center the floating plate 18 on base 10 and yet allow deflection as required in the presence of laterally off-center forces.

The sidewalls of the groove in the upper surface of the floating plate member 18 as seen in FIGS. 3 and 4 are also protected by wearing plates 25 held in place by pins 25a extending into the floating plate 18. There are on the opposed wall of the guide tongue 19 no plates of this type opposite plates 25.

As best seen in FIG. 3, the base, a floating plate and a guide support each ram. Floating plate 18 and guide 12 are bolted to the base 10 by two or more spaced bolts 27 on each side (see FIG. 2) together with a prestressed heavy-duty, fatigue-resisting steel spring 28 on each bolt which springs supply predetermined pressure to hold the piece together. Springs 28 are selected of such size and effect that the rocking tendency of guide 12 due to vertical off-center blows can be controlled over a predetermined distance. As seen in FIGS. 2, 3 and 5, a single dowel 29 between the base 10 and the floating plate 18 prevents their relative longitudinal movement in the direction of the tongue and groove. Similarly, as seen in FIG. 2, 4 and 5, a pair of dowels 30 respectively prevent relative longitudinal movement in the direction of the tongue and groove between floating plate member 18 and ram guides 12a and 12b, respectively. In each case one of these pins or dowels is preferably anchored in one member and snugly but removably engages a hole in the other. As will be apparent, use of the pins 29 and 30 allows limited rotational movement and selection of locations of pins 30 is made in such a way that shock or vibration will be absorbed by the shims 24 and/or springs 23a as the floating plate member rotates.

The ram guiding groove or way of the guide 12 is also provided with wearing plates as seen in FIGS. 3 and 4. These include supporting plates 32 and side wearing plates 33a and 33b. The wearing plates therefore surround and guide the flanges 37 of the rams 11. Top wearing plates 34 are held by plates 35 bolted to guide 12 by bolts 36. All wearing plates are preferably of high quality wearing material, as they are in all other locations, in order to provide maximum life.

At least one of the pair of the side wearing plates 33b is tapered and matched in its taper with an opposed tapered steel adjusting wedge 38, shown in detail in FIGS. 5, 6 and 7. The adjusting wedge 38 causes the wearing plate 33b to present a wearing surface parallel to wearing plate 33a, but permits adjustment of that surface toward and away from plate 33a. This enables adjustment to keep flanges 37 of ram 11 in practical running clearance between wearing plates when ram temperature elevates due to die contact with hot stock each forging blow. Furthermore a change in position of wedges 38 permits compensation for wear. The adjusting wedges are provided with teeth 38a, as best seen in FIG. 8, which teeth mesh with teeth 43a of a hardened steel locking member 43. Locking member 43 in addition to its teeth 43a has shoulders 43b against which springs 44 abut, urging the whole member upward and away from the teeth 42a. The springs 44 extend between these shoulders and shoulders 45a on a hollow rectangular member 45 whose shoulders lie on each side of the locking member in the direction of ram movement. Member 45 is fixed in a recess in cover member 35. Extending through the cover member in threaded engagement therewith is screw member 47. Screw member 47 extends to and presses against the end of the locking member opposite that on which are its teeth 43a in opposition to the springs 44 and thereby urge the locking member into locking engagement with tapered wedge 38. Screw 47 is provided with a lock nut 47a so that once engaged with teeth 38a, teeth 43a may be held in position. When it is desired to change position of a wedge 42 and hence the tightness or looseness of wearing plate 33, lock nut 47a is first loosened and screw 47 adjusted to permit the release of the teeth 42a from the corresponding teeth 43a of locking member 43 under the urging of springs 44. After repositioning, the locking member is set in place again by the reverse procedure.

When the impellers strike a hard blow on a piece of stock located outside the impacter centerline, the off-center blow forces are transferred to guides 12 and thence to the floating plate 18. When the rams strike a piece of material off-center to the left or right side of the centerline, the floating plate 18 tends to deflect and its deflection is permitted to develop freely and fully about pin 30 through the shim pack 24. This occurs without transmitting any appreciable amount of vibration to the base 10 and any components housed in the base.

When the impacters are actuated and strike a hard blow on a piece of stock located up or down from the impacter centerline, the shock and vibration resulting from the off-center blow is also isolated from the base. When the stock is located above the horizontal centerline of the rams, the heavy-duty springs 28 on bolts 27 (see FIGS. 2 and 3) absorb the shock. When the stock is located below the horizontal centerline of the ram, the cushioning member 20 tends to absorb the shock.

It will be seen that the machine as described above has its base substantially isolated from shock and vibrations produced by off-center blows. Moreover, guide groove adjustment to keep the sidewalls of the groove snug about the ram and prevent misalignments resulting in shock and vibration is also provided. Modifications in structure in accordance with the teachings of this invention will occur to those skilled in the art. All such modifications within the scope of the claims are intended to be within the scope and spirit of the present invention.

I claim:

1. A horizontal impacter comprising a supporting base structure isolated from shock and vibrations, a pair of aligned rams, horizontally arranged and movable toward and away from one another, pistons for driving each of said rams connected to said rams, fluid cylinders on the supporting base containing the pistons, guide means for supporting and directing movement of said rams, said intermediate floating plate means through which said guide means are fixed to the base, such that the floating plate means serves to resiliently cushion the base from vibrations resulting from off-center blows struck by the rams and transmitted through the guides.

2. The impacter of claim 1 in which a fabric-like layer of shock absorbing material is provided between the floating plate member and one of adjacent members.

3. The structure of claim 2 in which the shock absorbing material is placed between the floating plate means and the base.

4. The horizontal ram impacter of claim 1 wherein the floating plate is connected to at least one of the adjacent members by a tongue and groove formed in said respective adjacent members extending in the direction of ram alignment such that at least one of the generally vertically oriented walls of one of the tongue and groove members is provided with a wearing plate backed with resilient spring means capable of yielding under vibrations or shocks tending to compress it.

5. The structure of claim 4 in which resilient spring means is a pack of resilient shims.

6. The structure of claim 5 in which wearing plates backed by shim packs are provided on each side of said one of the tongue and groove members.

7. The structure of claim 6 in which the wearing plates and shim packs are supported on the side walls of the floating plate in opposition to the tongue of the base member.

8. The structure of claim 7 in which the floating plate member is pivotally connected to the base on the centerline of the tongue and groove and the wearing plates are supported on bolts on which they slide as the spring shims compress.

9. The ram impacter of claim 1 in which at least a pair of generally vertically oriented bolts is employed to bolt together the base, floating plate and the guide together with a suitable heavy-duty spring element on each bolt which spring compresses to absorb shock or vibration occurring when a blow is struck vertically off-center.

10. The ram impacter structure of claim 9 in which at least four such bolts are provided for each guide, two on each side of the ram and widely spaced relative to guide length.

11. The ram impacter structure of claim 10 in which a fabric-like shock absorbing material is placed between the floating plate member and the base.

12. The ram impacter of claim 1 in which the guide means for supporting and directing the ram are respectively provided with guide grooves having generally vertical walls and which guide grooves accept and guide a portion of the ram and in which adjustable wearing plates are provided between the ram and the guide on the vertical walls of the guide groove in order to keep the members in engagement to control the accuracy in guiding effect on the ram.

13. The impacter of claim 12 in which one of the wearing plates is longitudinally tapered in the direction of the groove and provided with a matching tapered wedge whose position is longitudinally adjustable.

14. The impacter of claim 13 in which a cover plate held against the guide and overlying the wearing plate associated with the wedge is provided with means to releasably engage and hold the wedge in a selected position.

15. The impacter of claim 14 in which the means to engage the wedge and the wedge are provided with intermeshing teeth, the means to engage the wedge being spring urged away from the wedge and urged against the wedge by screw means threaded through the cover plate.

References Cited by the Examiner

UNITED STATES PATENTS

| | | | |
|---|---|---|---|
| 1,404,150 | 1/1922 | Smith | 72—456 |
| 2,386,155 | 10/1945 | Weyer | 72—456 |
| 2,615,306 | 10/1952 | Alcorn | 60—97 |
| 2,729,943 | 1/1956 | Clarke | 72—407 |
| 2,742,802 | 4/1956 | Clarke | 72—4 |

CHARLES W. LANHAM, *Primary Examiner.*

G. P. CROSBY, *Examiner.*